E. B. HYDE.
HARNESS.
APPLICATION FILED DEC. 23, 1910.
1,002,696.
Patented Sept. 5, 1911.
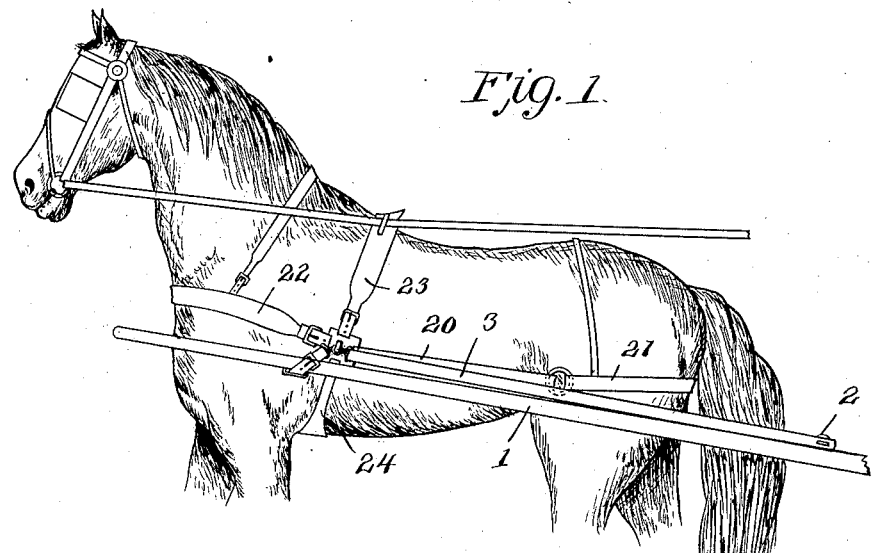
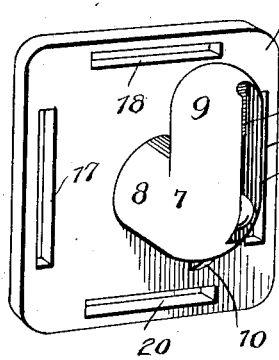
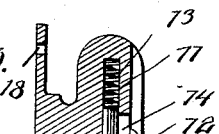
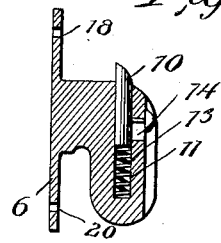
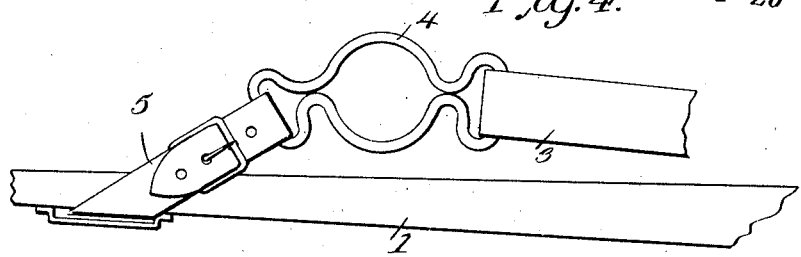
Witnesses
William Smith
Inventor
Emory B. Hyde.
By Victor J. Evans
Attorney
COLUMBIA PLANOGRAPH CO., WASHINGTON, D. C.

UNITED STATES PATENT OFFICE.

EMORY B. HYDE, OF DE SOTO, WISCONSIN, ASSIGNOR OF ONE-HALF TO JOHN W. THAYER, OF VIROQUA, WISCONSIN.

HARNESS.

1,002,696. Specification of Letters Patent. Patented Sept. 5, 1911.

Application filed December 23, 1910. Serial No. 598,886.

*To all whom it may concern:*

Be it known that I, EMORY B. HYDE, a citizen of the United States, residing at De Soto, in the county of Vernon and State of Wisconsin, have invented new and useful Improvements in Harness, of which the following is a specification.

This invention relates to means for expeditiously and securely attaching an animal to a vehicle and for quickly detaching the animal from a vehicle.

The primary object of the invention is to provide a device of this class which is simple in construction, which dispenses with a number of parts of a harness, and which will perform the functions for which it is intended with ease and with accuracy.

With the above, and other objects in view which will appear as the description progresses, the invention resides in the novel construction and arrangement of parts hereinafter fully described and claimed.

In the accompanying drawings there has been illustrated a simple and preferred embodiment of the improvement, it being understood, however, that the showing therein is merely illustrative and that changes in the minor details of construction may be resorted to if desired.

In the drawings: Figure 1 is a view of a harnessed horse and the shaft of a vehicle, the horse being attached to the vehicle through the medium of my improved combination fixture. Fig. 2 is a perspective view of one form of the improved fixture. Fig. 3 is a longitudinal sectional view of the same. Fig. 4 is a detail view of a vehicle thill provided with the securing ring or member employed with the combination. Fig. 5 is a longitudinal sectional view of a modified form of the fixture. Fig. 6 is a sectional view of a still further modified form of the fixture.

In the accompanying drawing the numeral 1 designates a shaft or thill of a vehicle. The vehicle thills are provided with the usual swingletree 2, and securely connected, in any desired manner, with the ends of the swingletrees are the longitudinally extending straps or tugs 3, one of which being illustrated in the drawings. The straps 3 may be constructed of any desired material, such as leather, iron, steel etc., and these straps are adapted to extend from the swingletree in a plane substantially parallel with the thills of the vehicle and to terminate a suitable distance away from the front ends thereof. The straps or tugs are each provided with what may be termed a collar or ring member 4, and each of said collars or rings is loosely connected with the shaft through the medium of what I term a holdback member 5. This hold-back member is preferably constructed in the form of a strap, the same being passed through a suitable bail or the like provided upon the outer face of the thill, though I do not desire to limit myself to this precise means of securing the said straps to the thill. The holdback member 5 is adapted to limit the movement of the tug so as to compensate for the swinging of the swingletree 2.

The numeral 6 designates what I term a securing or combination plate. This plate is preferably constructed of metal, and is also preferably either of a square or rectangular formation. The plate is centrally provided with a latch or projection 7. The latch or projection may be constructed in any preferred or desired manner and of any desired formation, but in the devices illustrated in Figs. 2, 3 and 5 of the drawing, the said latch is substantially L-shaped and comprises the offset portion 8, which is secured to the plate 6 and the vertical angular extension 9, which is arranged parallel with and at a distance from the plate 6. In the said figures of the drawing the member 9 of the latch or projection 7 is provided with a spring-pressed dog 10, the said dog being mounted within a suitable bore or opening 11 provided by the member 9 and being formed with an offset head or projection 12, whereby the said dog may be retracted within its bore when desired. In order to normally project the engaging face of the dog from the bore 11, I have provided a helical spring 13, the latter being positioned within the said bore and adapted to bear against the upper face of the dog 10. The outward movement of the dog is limited by the offset member 12, and the upward movement of the said dog is also limited through the medium of an opening 14 formed between the bore and the outer wall 15 provided by the depressed or longitudinal cut-away portion 16 upon the outer face of the member 9.

In Figs. 2 and 3 it will be noted that the dog is projected downwardly of the member 7, so that the said projected portion is arranged diametrically opposite the offset or member 9, while in Fig. 5 the dog is extended upwardly and directly opposite the offset or member 9. The projected portion of the dog 10 has its outer face rounded as clearly illustrated in the several figures of the drawing, and when it is desired to attach the ring or sleeve 4 to the member 7 it is merely necessary to insert the same over the top of the member 9 and by simply turning the said ring so that one of its edges is brought into contact with the rounded portion of the dog 10, the latter will be retracted within its bore 11 until the said member 4 passes the dog. As soon as this is accomplished the spring 13 will again force the dog outwardly and thereby effectively and securely retain the collar or ring 4 upon the portion 8 of the L-shaped member 7. It will be perfectly apparent when the collar or ring is so positioned accidental removal of the same is entirely obviated.

The plate 6 is formed with four elongated openings designated respectively by the numerals 17, 18, 19 and 20. The openings 17 and 19 are arranged diametrically opposite each other and at right angles to the openings 18 and 20. It is to be understood that one of the combination fixtures 6 is positioned upon each side of the harness, and the opening 19 of each of the said fixtures is adapted for the reception of the side strap 20 which is connected with the breeching 21 of the harness. The opposite opening 17 of each of the said plates is connected with the breast strap or short tug 22, the opening 18 being secured to the back pad or saddle 23 of the harness, while the remaining opening 20 accommodates the belly band 24. These several straps are provided with buckles whereby the same may be adjusted to accommodate the different sizes of animals to be attached to the vehicle.

By hitching the member 4 to the combination fixture, it will be noted that when the harness straps are attached to the plate thereof, two complete and distinct circuits of the harness are obtained, the said circuits crossing each other in the fixture, thus securing perfect harmony of action of all parts of the harness especially employed either when an animal is pulling or holding back, and thereby dispensing with all straps and connections which are not supported by others and which would render ordinary harness and connections dangerously inefficient. My structure further serves to avoid any possible accident to the person hitching an animal to or unhitching an animal from the vehicle.

As heretofore stated the latch or projection of the combination fixture is not restricted to the precise structure illustrated and heretofore described, and in Fig. 6 I have illustrated one of the many modifications which may be employed. In this figure the plate 25 is provided with the harness openings similar to that of the plate 6. The latch 26, however, comprises simply an offset or projection, the same being formed with a bore 28 within which is positioned a sliding dog 29, the said dog being normally forced outward through the medium of a spring 30. The member 27 is formed with an opening 31 communicating with the bore 28, and this opening is adapted for the reception of the projecting finger operating member 32 secured to the body of the latch or projection. The ring or collar 33 is formed with a pocket 34 upon only one of its faces, the said pocket having its inner wall straightened and its top portion rounded to correspond with the contour of the projecting face of the dog. It will be readily noted that when the said ring or collar is placed over the member 27 the dog 29 will readily be forced within the said pocket through the medium of the spring 30 and the ring or collar securely locked upon the member 28 of the plate 25.

From the above description, taken in connection with the accompanying drawings, it will be noted that I have provided an extremely simple and thoroughly effective device for quickly and securely hitching an animal to a vehicle; that the device obviates the necessity of inserting the shafts in loops or necessitating the wrapping of the stay straps of the belly band around the shafts, and one wherein a young or fractious animal may be attached to a vehicle without danger to the person having charge of the animal.

Having thus described the invention, what I claim as new is:—

1. In a shaft hitching device, a trace connected with the swingletree of the shafts, a hold-back connected to the shaft, a ring connected with the hold-back and trace, and a harness securing plate provided with a substantially L-shaped latch member, and a spring-pressed dog within the vertical arm of the said latch member adapted to engage the ring of the hold-back and trace.

2. In a device for the purpose set forth, a substantially rectangular plate, said plate being provided adjacent each of its four edges with harness strap receiving openings, the said plate being centrally provided with an L-shaped member, a spring-pressed latch within the vertical portion of the L-shaped member, said latch adapted to project below the said member and to have its outer face inclined toward the plate, and a ring upon the shaft adapted to be engaged by the said L-shaped member.

In testimony whereof I affix my signature in presence of two witnesses.

EMORY B. HYDE.

Witnesses:
CLARENCE W. GREEN,
VINA SEYMOUR.

Copies of this patent may be obtained for five cents each, by addressing the "Commissioner of Patents, Washington, D. C."